No. 836,875. PATENTED NOV. 27, 1906.
F. H. GILBERT.
TRACTION VEHICLE.
APPLICATION FILED JAN. 9, 1906.
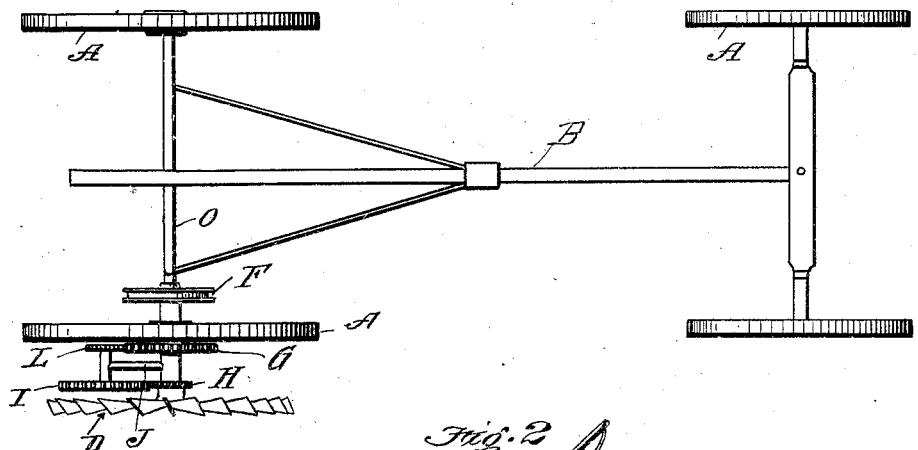
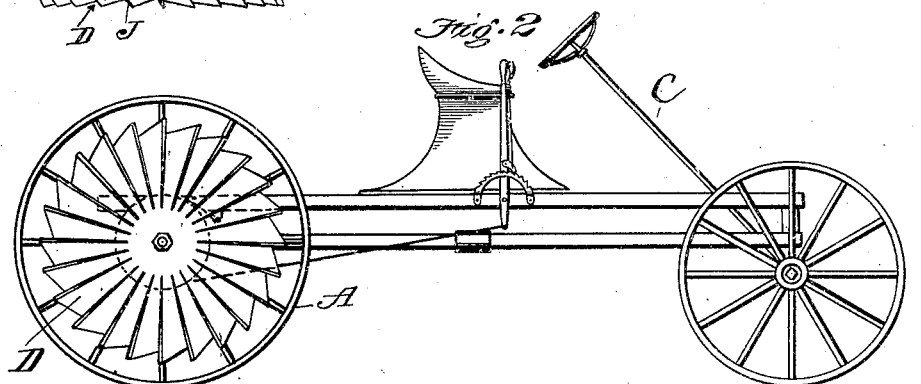
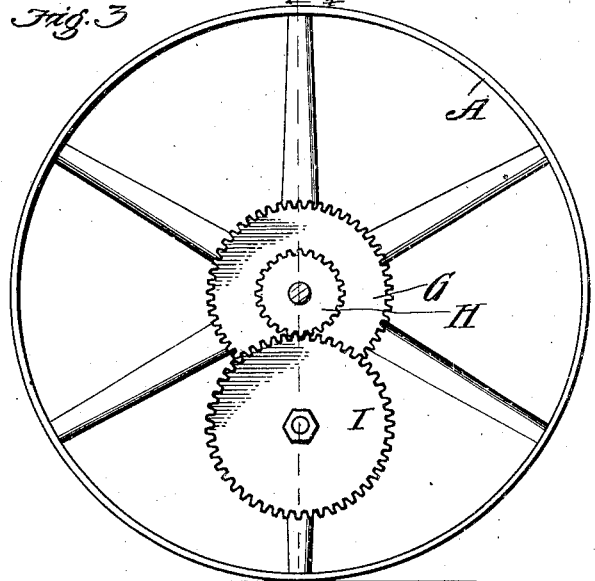
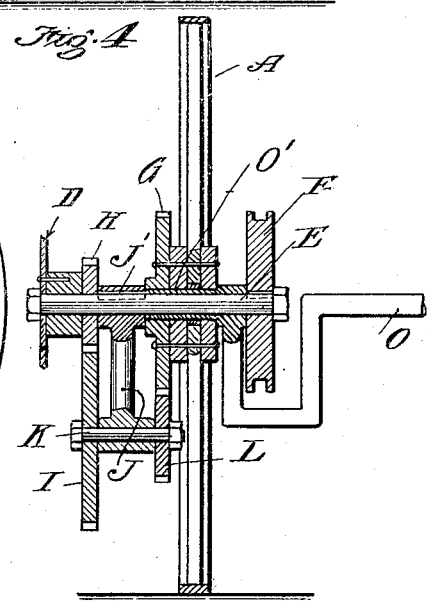
Witnesses
Inventor
Fredrick H. Gilbert
By Hazard & Harpham, Attys.

UNITED STATES PATENT OFFICE.

FREDRICK H. GILBERT, OF LOS ANGELES, CALIFORNIA.

TRACTION-VEHICLE.

No. 836,875.

Specification of Letters Patent.

Patented Nov. 27, 1906.

Application filed January 9, 1906. Serial No. 295,286.

*To all whom it may concern:*

Be it known that I, FREDRICK H. GILBERT, a citizen of the United States, residing at Los Angeles, in the county of Los Angeles and State of California, have invented new and useful Improvements in Wind Traction, of which the following is a specification.

The object of my invention is to utilize the wind in propelling vehicles or operating machinery, and I accomplish this object by means of the device described herein and shown in the accompanying drawings, in which—

Figure 1 is a plan of the running-gear of a vehicle with my device secured to one wheel thereof. Fig. 2 is a side elevation thereof. Fig. 3 is an elevation of an enlarged wheel, showing parts of my device secured thereto. Fig. 4 is a central vertical section of my device, taken on the line 4 4 of Fig. 3.

In the drawings, A represents the wheels of the running-gear, and B the frame thereof, in the center of which is mounted the seat for the driver, in front of which is the steering-column C. Mounted on the axle E are the wind propelling-wheels D, one wheel of the vehicle only being shown in the drawings as equipped with a wind-wheel. To show more would unnecessarily obscure the drawings. These wind-wheels are mounted coaxially with the wheels of the vehicle in the manner shown in the drawings, as follows: The wheel A is loosely mounted on the sleeve O' of the axle O, which forms a bearing for the supplemental axle E, the spur-gear G being bolted to the wheel A. On the inner end of this axle E, which projects through the sleeve O', is keyed the brake-drum F. The axle E carries keyed thereon, as at J', the revolving arm J. Loosely mounted on the axle E and adjacent to the revolving arm is a spur-gear H, which is keyed or otherwise secured to the wind-wheel and moves therewith. This gear in turn meshes with the spur-gear I, rotatively mounted on the bolt K. The bolt K projects outwardly on both sides of the revolving arm, carrying on one end thereof the spur-gear I and on the other end the spur-gear L, both gears being keyed to the bolt K.

Motion being imparted to the wind-wheel, carrying with it the spur-gear H, which meshes in turn with the spur-gear I and imparts motion to the gear L, mounted on the same shaft and revolving therewith. The spur-gear L meshes with the spur-gear G, and thereby transmits motion from the wind-wheel to the wheel of the vehicle. The dimensions of the spur-gears will indicate the number of revolutions which the wind-wheels will make to one revolution of the wheels of the vehicle. This is determined by the number of cogs on the various spur-gears G, H, I, and L, the relative size of which can be changed to suit the use to which the vehicle is intended to be put.

The steering-gear usually employed in autovehicles is not shown, as the same constitutes no part of my invention. A band-brake M extends from the hand-brake lever N around the brake-drum F, and the movement of the vehicle is controlled thereby.

When it is desired to start the vehicle, the brake is thrown into engagement with the brake-drum and acting in a manner similar to the clutch in an automobile will gradually start the vehicle. The brake-band slipping on the drum as the brake is thrown into position will gradually and easily start the car. As long as the brake is set the wheels of the vehicle will be connected with the wind-wheels and the vehicle will move; but upon releasing the brake the wind-wheels and the wheels and the vehicle will be disconnected and the vehicle will gradually come to a stop. The revolving arms, which when the vehicle is moving remain stationary, will now idle and revolve around on the supplemental axle in a direction reverse to that in which the wind-wheel is moving. When the brake-drum is prevented from revolving by reason of the engagement therewith of the brake-band, the swinging arms will come to a stop, compelling the wheel of the vehicle to move in the direction in which the wind-wheels are moving.

Having described my invention, what I claim as new, and desire to secure by Letters Patent, is—

1. In an autovehicle adapted to be propelled by wind, the herein-described means to connect a wind-wheel with a wheel of the vehicle comprising a supplemental axle, a spur-gear keyed to the hub of the vehicle and adapted to mesh with a spur-gear mounted on a shaft carried on a revolving arm, a revolving arm keyed on the supplemental axle, a spur-gear keyed on each end of said shaft and adapted to mesh one with a spur-gear rigidly affixed to the hub of the wind-wheel and the other with a spur-gear keyed to the wind-wheel, a brake-drum keyed on the inner end of said supplementary shaft, a wind-wheel carried by said shaft in combination with means to brake the brake-drum when desired.

2. In a device of the character herein described, a supplementary axle E having keyed thereon on the inner end thereof the brake-drum F, the said supplementary axle carrying keyed thereto the revolving arm J, a bolt K extending through the outer end of said revolving arm and carrying on one end thereof the spur-gear L and on the other end thereof the spur-gear I, a spur-gear G keyed to the axle of the wheel A, the wind-wheel D having secured thereto the spur-gear H adapted to mesh with the spur-gear K, the said wind-wheel being loosely mounted on the supplementary shaft E in combination with the brake-band M and the brake-lever N substantially as herein shown and described.

3. In a vehicle adapted to be propelled by wind and having wind-wheels, the herein-described means to operatively connect the wind-wheels to the wheels of the vehicle comprising a supplementary axle rotatively mounted on the axle of the vehicle, a brake-drum on the inner end of said supplementary axle, the said supplementary axle carrying a revolving arm keyed thereon and a wind-wheel loosely mounted thereon, a shaft loosely carried on the free end of the revolving arm and having a spur-gear keyed on each end thereof, one of the spur-gears adapted to mesh with a spur-gear rigidly affixed to the wheel of the vehicle and the other spur-gear adapted to mesh with a spur-gear rigidly affixed to the wind-wheel and braking means substantially as herein shown and described.

In witness that I claim the foregoing I have hereunto subscribed my name this 30th day of December, 1905.

FREDRICK H. GILBERT.

Witnesses:
M. A. JONES,
G. E. HARPHAM.